United States Patent [19]
Lee et al.

[11] Patent Number: 5,534,781
[45] Date of Patent: Jul. 9, 1996

[54] COMBUSTION DETECTION VIA IONIZATION CURRENT SENSING FOR A "COIL-ON-PLUG" IGNITION SYSTEM

[75] Inventors: Anscn Lee, St. Clair; Jan S. Pyko, Bloomfield Township, both of Mich.

[73] Assignee: Chrysler Corporation, Auburn Hills, Mich.

[21] Appl. No.: 291,644

[22] Filed: Aug. 15, 1994

[51] Int. Cl.[6] .......................... F02P 17/00; G01M 15/00
[52] U.S. Cl. .......................... 324/380; 324/388; 324/393; 324/459; 73/117.3
[58] Field of Search ...................... 324/378, 380, 324/459, 460, 462, 464, 388, 393, 399; 73/116, 117.3; 123/630, 655

[56] References Cited

U.S. PATENT DOCUMENTS

| | | | |
|---|---|---|---|
| 4,491,110 | 1/1985 | Bone et al. | 123/425 |
| 4,556,040 | 12/1985 | Heyke | 123/643 |
| 4,648,367 | 3/1987 | Gillbrand et al. | 123/425 |
| 4,886,029 | 12/1989 | Lill et al. | 123/479 |
| 4,987,771 | 1/1991 | Iwata | 73/117.3 |
| 5,087,882 | 2/1992 | Iwata et al. | 324/388 |
| 5,111,790 | 5/1992 | Grandy | 123/425 |
| 5,178,001 | 1/1993 | Ikeuchi et al. | 73/117.3 |
| 5,180,983 | 1/1993 | Murata et al. | 324/399 |
| 5,180,984 | 1/1993 | Murata et al. | 324/399 |
| 5,216,369 | 6/1993 | Toyama | 324/388 |
| 5,230,240 | 7/1993 | Ohsawa et al. | 73/116 |
| 5,269,282 | 12/1993 | Miyata et al. | 123/627 |
| 5,271,268 | 12/1993 | Ikeuchi et al. | 73/115 |
| 5,272,914 | 12/1993 | Murata et al. | 73/116 |
| 5,293,129 | 3/1994 | Ikeuchi et al. | 324/399 |
| 5,307,786 | 5/1994 | Murata et al. | 123/635 |
| 5,377,653 | 1/1995 | Hamada et al. | 123/655 |
| 5,396,176 | 3/1995 | Ishii et al. | 324/388 |
| 5,397,990 | 3/1995 | Ohsawa | 324/399 |
| 5,483,818 | 1/1996 | Brandt et al. | 324/393 X |

*Primary Examiner*—Kenneth A. Wieder
*Assistant Examiner*—Glenn W. Brown
*Attorney, Agent, or Firm*—G. Andrew Barger

[57] ABSTRACT

An ionization current sensing circuit providing a way to detect the combustion event in a spark ignited engine cylinder. The presence of an output signal from the proposed circuit indicates that a flame exists and that combustion has occurred in the cylinder. This signal is drastically changed if combustion is absent, the circuit providing viable engine misfire detection. The ionization current sensing circuit comprising a power source for providing voltage directly to the primary winding of the ignition coil, an integrator for integrating a spark plug ionization current and thereby providing a voltage output in proportion to the integral of the ionization current, and an ionization current sensing module for sensing a spark plug ionization current, the ionization means connected between the secondary winding of the ignition coil and the integrator means.

17 Claims, 3 Drawing Sheets

5,534,781

COMBUSTION DETECTION VIA IONIZATION CURRENT SENSING FOR A "COIL-ON-PLUG" IGNITION SYSTEM

BACKGROUND OF THE INVENTION

1. Field of the Invention

The present invention relates generally to combustion detection and, more particularly, to a system for detecting combustion through the use of ionization current sensing.

2. Description of the Art

Two challenges facing vehicle manufactures are the improvement of fuel economy and the reduction of emissions without significantly increasing vehicle costs. One way of accomplishing such tasks is through the use of detecting various combustion states in the cylinders of internal combustion engines. Such feedback information can then be supplied to various engine components which can be adjusted to action in accordance with the combustion cycle. Detection of such combustion may be obtained by sensing ionization current which may occur given the existence of ions in a combustion cylinder. The ions are typically generated within the cylinders due to chemical reactions between compressed air and fuel subject to combustion. The concentration of ions, indicative of the combustion state in any given cylinder, can be detected by the means of ionization current flowing across air gaps which exist in the cylinder. Applying a voltage across an air gap in a cylinder, when ions are present, allows for the detection of a vehicle combustion state by sensing ionization current which flows across the gap. Typically, the air gap between the electrodes of a spark plug which is already disposed within each cylinder, is used to take measurements for determining the amount of ionization current flow.

Prior current sensing ionization circuits, consisting of distributor, distributor-less, and "coil-on-plug" ignition systems, require the use of high voltage diodes to protect the ionization circuit from voltage spikes during combustion. Such circuits are costly given the high expense of the high voltage diodes. Furthermore, since the diodes are required to be connected between each cylinder and the ionization circuit, if one of the diodes is shorted, there will be no ignition in the corresponding cylinder. Prior ionization circuits also do not deal effectively with "smoothing out" the excited ionic current wave form which is produced on combustion. Such circuits further require the use of an extra signal processing unit to process the ionic current wave form. The use of such a signal processor is costly and can increase the size and number of components needed to detect combustion via ionization current sensing. The additional processing unit may also produce electromagnetic interference with other circuit componentry.

Therefore, it would be desirable in the art of motor vehicle to have an ionization current sensing circuit that is inexpensive to produce, has relatively few components, and produce a smooth current ionization output signal.

SUMMARY OF THE INVENTION

In accordance, an ionization current sensing circuit providing a way to detect the combustion event in a spark ignited engine cylinder. The presence of an output signal from the proposed circuit indicates that a flame exists and that combustion has occurred in the cylinder. This signal is drastically changed if combustion is absent, the circuit providing viable engine misfire detection which may be read by an ECU. The present ionization current sensing circuit comprising a power source for providing voltage directly to the primary winding of the ignition coil thereby alleviating the need for costly high voltage diodes. Integrator means are also provided for integrating a spark plug ionization current and thereby providing a voltage output in proportion to the integral of the ionization current. The present device also includes a ionization current sensing module for sensing a spark plug ionization current, the ionization means connected between the secondary winding of the ignition coil and the integrator means.

Therefore, it is an object of the present invention to provide an apparatus for detecting combustion via ionization current sensing that is relatively inexpensive to produce while yielding better performance characteristics than conventional ionic current sensing apparatuses.

It is a further object of the present invention to utilize a regular spark plug as an ionization current sensing device. Moreover, the invention provides for the use of direct ionization current sensing for engine misfire detection.

Another object of the present invention is the use of circuitry which disables ionization current sensing during ignition coil discharge. Furthermore, an integrator is used in the present invention to produce a more robust and easier to handle output signal.

A further advantage of the present invention is that an ignition coil secondary current is used to produce the sensing source required for ionization current measurement.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein:

FIG. 6 is a signal representation diagram of the electrical characteristics of circuit components of the present invention as shown in FIG. 4 and FIG. 5.

DESCRIPTION OF THE PREFERRED EMBODIMENT(S)

Figure 1:
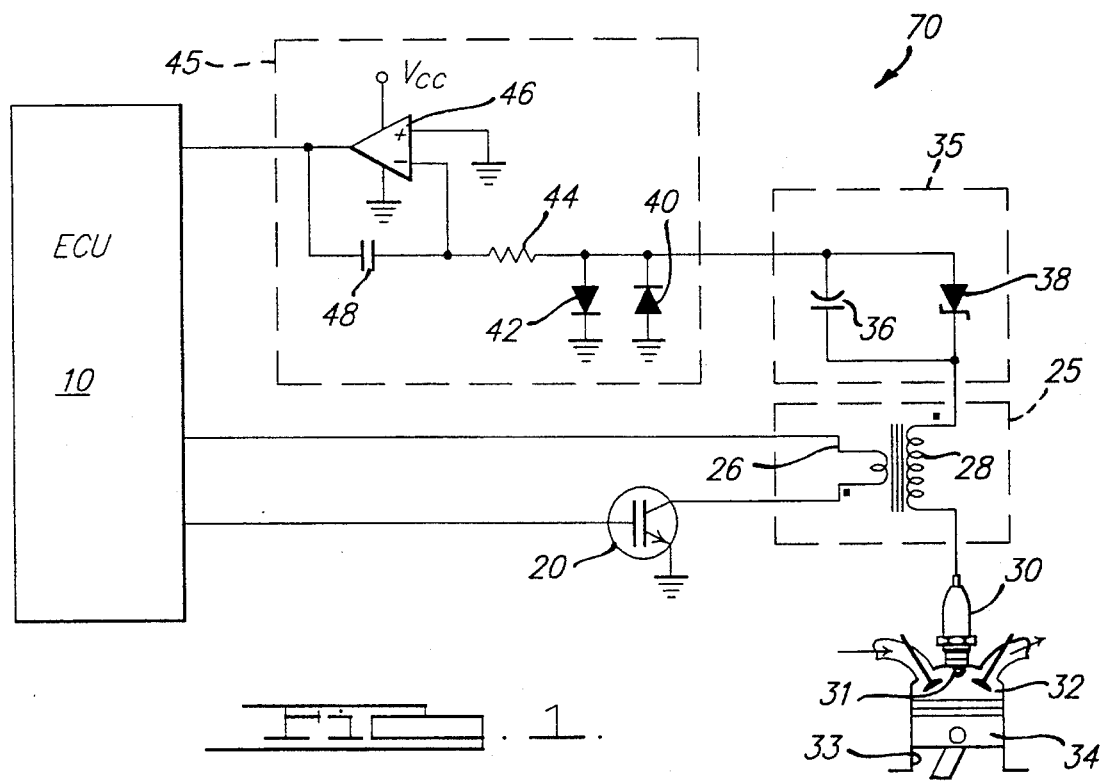
FIG. 1 is a schematic view of a current ionization sensing system of the present invention.

Referring to FIG. 1, a schematic view of a particular embodiment of the present invention for a ionization current system 70 is shown. The control system 70 comprises an engine controller or Electronic Control Unit (ECU) 10. The ECU 10 includes a microprocessor, memory (volatile and non-volatile), bus lines (address, control, and data), and other hardware and software needed to perform the task of engine control. The ionization current system 70 further includes an ignition coil 25, having a primary 26 and secondary winding 28, for providing current to a spark plug 30 upon ignition of the vehicle. The spark plug 30 is electrically connected to the secondary winding 28 of the ignition coil 25 and is mounted on the head of the cylinder 33. The spark plug 30 has electrodes 31 disposed within a combustion chamber 32 of the vehicle for igniting an air/fuel mixture in the combustion chamber 32 when voltage arcing occurs between the electrodes 31. The combustion chamber 32 is defined by walls of the cylinder 33 and a piston 34 which is received in the cylinder 33.

The ionization current sensing system 70 further comprises a power transistor 20 having a base, emitter, and collector. The transistor 20 could also be a MOSFET having a gate, source, and a drain. The base or gate being connected to the DWELL output signal 18 of the ECU 10, the emitter or source grounded, and the collector or drain connected to the primary winding 26 of the ignition coil 25. The ECU 10 has a DWELL output signal 18 for providing current and voltage to the base of the power transistor 20. The ECU 10 also supplies a Vbat voltage output signal for supplying voltage directly to the primary winding 26 of the ignition coil 25.

The ionization current sensing system 70 also includes sense voltage means for sensing the ionization which occurs in the combustion chamber 32. In the preferred embodiment the sense voltage source 35 consists of a zener diode 38 and a capacitor 36. The capacitor 36 stores a voltage relative to the ionization current of the spark plug 30. The zener diode's cathode is electrically connected to the secondary winding 28 of the ignition coil 25 and the positive polarity terminal of capacitor 36. The capacitor's negative polarity terminal is connected to the anode of the zener diode 38 and is also connected to the input of the integrator means. In the preferred embodiment, an integrating current to voltage converter is used for the integrating means. While it is to be understood that other integration circuits could also be employed.

The integrator 45 is included in the ionization current sensing system 70 for providing a smooth, robust, easy to read output voltage signal representation of the ionization current. The input line of the integrator 45 is connected to the anode of the zener diode 38 and the negative polarity side of the capacitor 36. The integrator comprises two diodes 40, 42 in parallel having anodes placed in opposite direction. The anode of diode 40 is grounded and the cathode connected to the input line of integrator 45. The anode of diode 42 is connected to the input line of integrator 45 and the cathode of diode 42 is grounded. The integrator 45 also has a resistor 44 and capacitor 48 connected in series. The resistor 44 connected to the integrator input line on one end and capacitor 48 on the other end. This end of resistor 44 is also connected to the inverting input of operational amplifier 46. The non-inverting input of amplifier 46 is grounded. A voltage input feed Vcc is provided to power the operational amplifier 46 which also has a corresponding line by which the amplifier 46 is grounded. The amplifier output is connected to the capacitor 48 as well as the integrator output.

Figure 3:
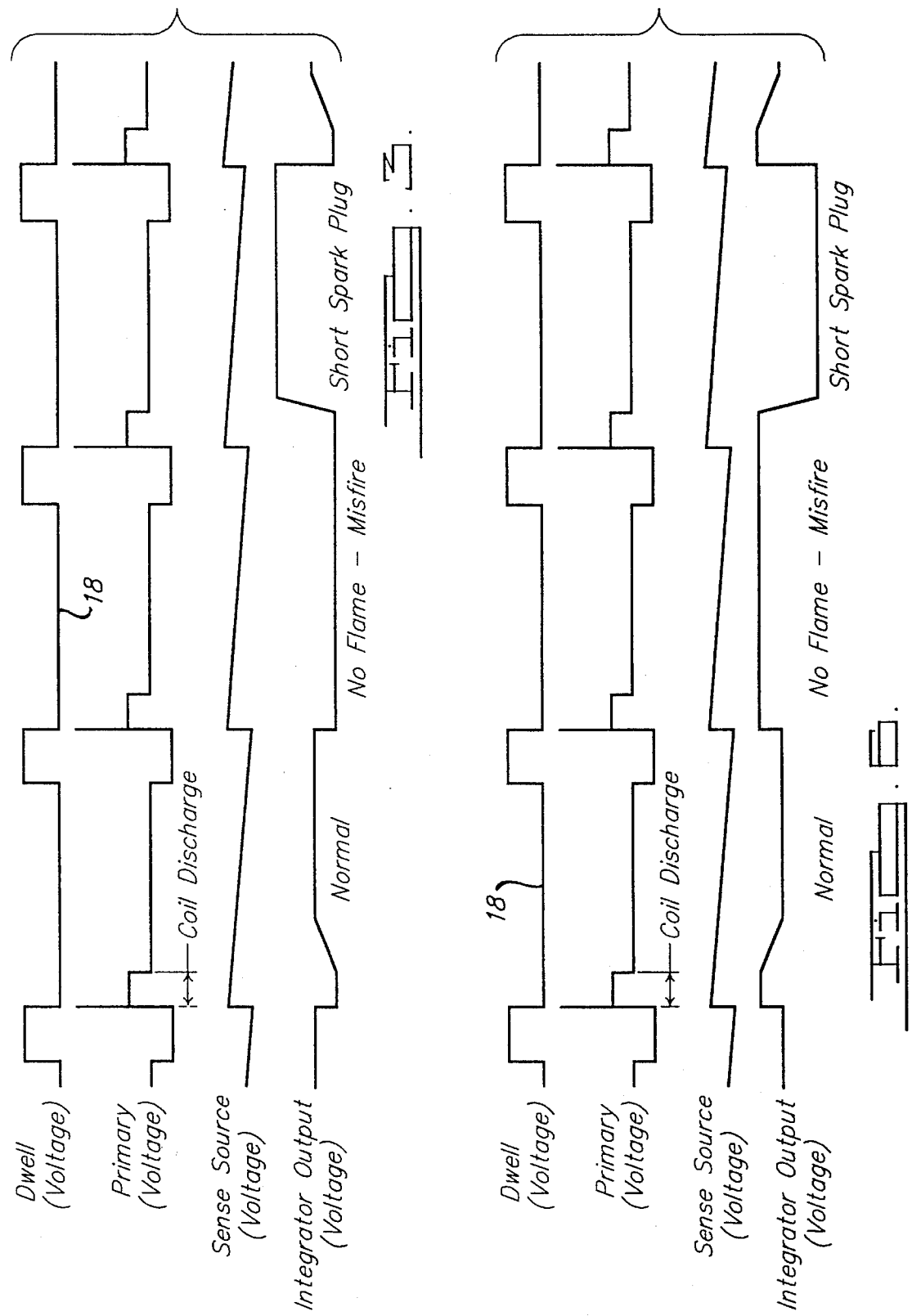
FIG. 3 is a signal representation diagram of the electrical characteristics of circuit components of the present invention as shown in FIG. 1 and FIG. 2.

The functional description of FIG. 1 is as follows. FIG. 1 shows a circuit diagram of an ionization current sensing system 70 with an operational amplifier based integrator 45. During ignition of the vehicle, the ECU 10 supplies a constant Vbat voltage signal to the primary winding 26 and a DWELL voltage signal 18 to power transistor 20. Applying the DWELL voltage signal 18 to transistor 20 causes the transistor 20 to conduct, thereby building up current in the primary winding 26 of the ignition coil 25. As shown in FIG. 3, during the time the DWELL voltage signal 18 is being applied to transistor 20, the voltage of the primary winding 26 is decreased in proportion. When the DWELL signal 18 is turned off by the ECU 10, a voltage spike occurs at the primary winding 26 and the magnetic field of the ignition coil 25 starts to collapse. Such an occurrence generates a high voltage on the secondary winding 28. As shown in FIG. 1, the winding polarities of the primary and secondary winding are inverse such that when a positive voltage is applied to the power transistor terminal of the primary winding 26 a positive voltage will result at the sense voltage output of the secondary winding 28 and vice versa. Given such polarity when the DWELL signal 18 is turned off, the spark plug 30 will receive a negative voltage which lowers the breakdown voltage between the electrodes 31 of the spark plug 30. This allows a spark to more easily occur between the spark plug electrodes 31, especially for warm spark plugs.

After a spark occurs between the electrodes 31, DC current starts to flow from the sense voltage output of the secondary winding into the sense voltage source 35. Capacitor 36 is then charged to a voltage limited by zener diode 38 to approximately 100 volts. The current then flows through diode 42 to ground. The DC current also flows back to the spark plug connection of the secondary winding 28 and finally to the spark plug 30. When current flows through diode 42, the voltage on the anode of the diode 42 is limited to the diode drop voltage of approximately 0.4 to 0.7 volts depending on temperature and current. Such an event causes the operational amplifier 46 to discharge capacitor 48 resulting in the signal representation of integrator output voltage, which is supplied to the ECU 10, to go low. This resets the ionization current integrator 45. The ionization current integrator 45 comprises diodes 40, 42 for use as a voltage limiters and for providing a conductive current path for charging capacitor 36 of the sense voltage source 35.

After the ignition coil 25 discharges, capacitor 36 serves as a sense voltage source causing ionization current to flow through the coil's secondary winding 28 and the spark plug 30. The same current flows from the negative side of capacitor 36 into the current integrator 45 causing its output to rise. This is depicted in FIG. 3 by the signal representation of integrator output. Given proper selection of the integrator's time constant, its output is set between ground and Vcc for normal operation of the engine. If there is no combustion, there will be no ionization current flow after coil discharge, and the output of the integrator will remain low. For a shorted spark plug, the integrator output will rise to Vcc shortly after coil discharge. The integrator output voltage signal can be read by the ECU 10 at any time after combustion is completed.

Figure 2:
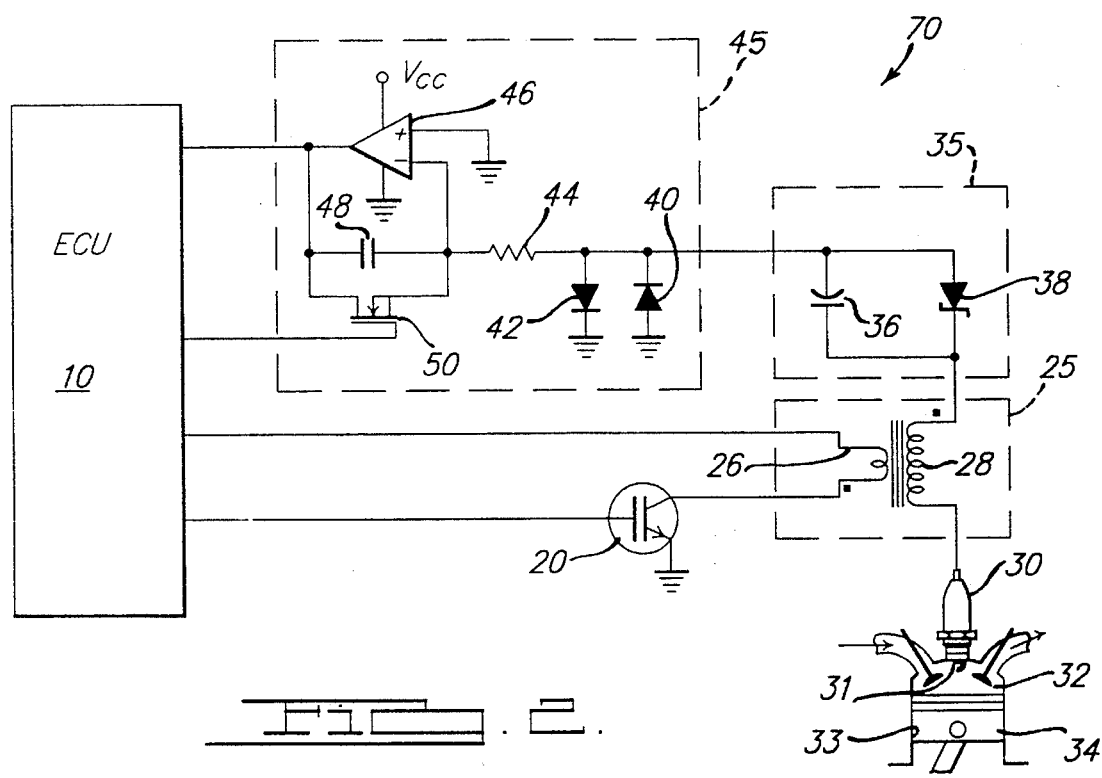
FIG. 2 is a schematic view of a current ionization sensing system of the present invention as shown in FIG. 1 with an additional reset circuit switch.

Referring now to FIG. 2, a schematic view of a particular embodiment of the present invention for a ionization current system 70 is shown. The control system 70 comprises an engine controller or Electronic Control Unit (ECU) 10. The ECU 10 includes a microprocessor, memory (volatile and non-volatile), bus lines (address, control, and data), and other hardware and software needed to perform the task of engine control. The ionization current system 70 further includes an ignition coil 25, having a primary 26 and secondary winding 28, for providing current to a spark plug 30 upon ignition of the vehicle. The spark plug 30 is electrically connected to the secondary winding 28 of the ignition coil 25 and is mounted on the head of the cylinder 33. The spark plug 30 has electrodes 31 disposed within a combustion chamber 32 of the vehicle for igniting an air/fuel mixture in the combustion chamber 32 when voltage arcing occurs between the electrodes 31. The combustion chamber 32 is defined by walls of the cylinder 33 and a piston 34 which is received in the cylinder 33.

The ionization current sensing system 70 further comprises a power transistor 20 having a base, emitter, and a collector. The transistor 20 could also be a MOSFET having a gate, source, and a drain. The base or gate being connected to the DWELL output signal 18 of the ECU 10, the emitter or source grounded, and the collector or drain connected to the primary winding 26 of the ignition coil 25. The ECU 10 has a DWELL output signal 18 for providing current and voltage to the base of the power transistor 20. The ECU 10 also provides a Vbat voltage signal for supplying voltage directly to the primary winding 26 of the ignition coil 25.

The ionization current sensing system 70 also includes a sense voltage source 35 for sensing voltage in relation to the ionization which occurs in the combustion chamber 32. The sense voltage source 35 consists of a zener diode 38 and a capacitor 36. The zener diode's cathode being electrically connected to the secondary winding 28 of the ignition coil 25 and the positive polarity side of capacitor 36. The capacitor's negative polarity terminal connected to the anode of the zener diode 38 and also connected to the input line of the integrator 45.

The integrator 45 is included in the ionization current sensing system 70 for providing a smooth, robust, easy to read output voltage signal representation of the ionization current. The input line of the integrator 45 is connected to the anode of the zener diode 38 and the negative polarity side of the capacitor 36. The integrator comprises two diodes 40, 42 in parallel having anodes placed in opposite relation. The anode of diode 40 grounded and the cathode connected to the input line of integrator 45. While the anode of diode 42 is connected to the input line of integrator 45 and the cathode grounded. The integrator 45 also has a resistor 44 and capacitor 48 connected in series. The resistor 44 connected to the integrator input line on one end and capacitor 48 on the other end. This end of resistor 44 is also connected to the negative polarity voltage input of operational amplifier 46. The amplifier 46 is grounded at its positive polarity voltage line. A voltage input feed Vcc is provided to power the operational amplifier 46 which also has a corresponding line by which the amplifier 46 is grounded. The amplifier output is connected to the resistor opposite terminal of capacitor 48 as well as the integrator output.

The circuit also includes a reset circuit switch 50. The switch 50 consists of a small signal N-Channel MOSFET having a gate, drain, and source. It is to be expressly understood that many different switches, both solid state and mechanical, could be used to provide circuit reset in the present invention. The source of switch 50 is connected to the node between resistor 44 and capacitor 48. The drain of switch 50 is connected to the opposite lead of capacitor 48 which is connected to the output lead of operational amplifier 46. The gate of switch 50 is connected to the ECU 10 or another circuit for receiving a reset signal.

The functional description of FIG. 2 is as follows. FIG. 2 shows a circuit diagram of an ionization current sensing system 70 with an operational amplifier based integrator 45. During ignition of the vehicle, the ECU 10 supplies a constant Vbat voltage signal to the primary winding 26 and a DWELL voltage control signal 18 to the power transistor 20. Applying the DWELL voltage signal 18 to transistor 20 causes current to flow from the base of the transistor 20 to the collector thereby building up current in the primary winding 26 of the ignition coil 25. As shown in FIG. 3, during the time the DWELL voltage signal 18 is being applied to transistor 20, the voltage of the primary winding 26 is decreased in proportion. When the DWELL signal 18 is turned off by the ECU 10, a voltage spike occurs at the primary winding 26 and the magnetic field of the ignition coil 25 starts to collapse. Such an occurrence generates a high voltage on the secondary winding 28. As shown in FIG. 2, the winding polarities of the primary and secondary winding are inverse such that when a positive voltage is applied to the power transistor terminal of the primary winding 26 a positive voltage will result at the sense voltage terminal of the secondary winding 28 and vice versa. Given such polarity when the DWELL signal 18 is turned off, the spark plug 30 will receive a negative voltage which lowers the breakdown voltage between the electrodes 31 of the spark plug 30. This allows a spark to more easily occur between the spark plug electrodes 31, especially for warm spark plugs.

After a spark occurs between the electrodes 31, DC current starts to flow from the sense voltage terminal of the secondary winding into the sense voltage source 35. Capacitor 36 is then charged to a voltage limited by zener diode 38 to approximately 100 volts. The current then flows through diode 42 to ground. The DC current also flows back to the spark plug terminal of the secondary winding 28 and finally to the spark plug 30. When current flows through diode 42, the voltage on the anode of the diode 42 is limited to the diode drop voltage of approximately 0.4 to 0.7 volts depending on temperature and current. Such an event causes the operational amplifier 46 to discharge capacitor 48 resulting in the integrator output voltage signal, which is supplied to the ECU 10, to go low. This resets the ionization current integrator 45. The ionization current integrator 45 comprises diodes 40, 42 for use a voltage limiters and for providing a conductive current path for charging capacitor 36 of the sense voltage source 35.

After the ignition coil 25 discharges, capacitor 36 serves as a sense voltage source causing ionization current to flow through the coil's secondary winding 28 and the spark plug 30. The same current flows from the negative side of capacitor 36 into the current integrator 45 causing its output to rise. This is depicted in FIG. 3. Given proper selection of the integrator's time constant, its output is set between ground and Vcc for normal operation of the engine. If there is no combustion, there will be no ionization current flow after coil discharge, and the output of the integrator will remain low. For a shorted spark plug, the integrator output will rise to Vcc shortly after coil discharge. The integrator output voltage signal can be read by the ECU 10 at any time after combustion is completed. The reset switch 50 allows for resetting the circuit at any time. This is accomplished by applying a reset voltage signal from the ECU 10, or an alternative circuit, to the gate of the switch 50. Upon such an occurrence the switch 50 will start conducting current causing reset of the ionization current integrator. Such a function can be used for diagnostic purposes such as checking and measuring spark plug leakage current offset.

The sense voltage source, consisting of capacitor 36 and zener diode 38, may be placed on the same circuit board with the ionization current integrator 45 or alternatively embedded into the housing of the ignition coil 25. There are distinct advantages to embedding the sense voltage source components, consisting of capacitor 36 and zener diode 38, into the ignition coil housing. The positive side of the sense voltage source 35 will be internal to the ignition coil housing and the sense voltage components will not be exposed to vehicle underhood environments which may cause current leaks or electromagnetic interference.

Figure 4:
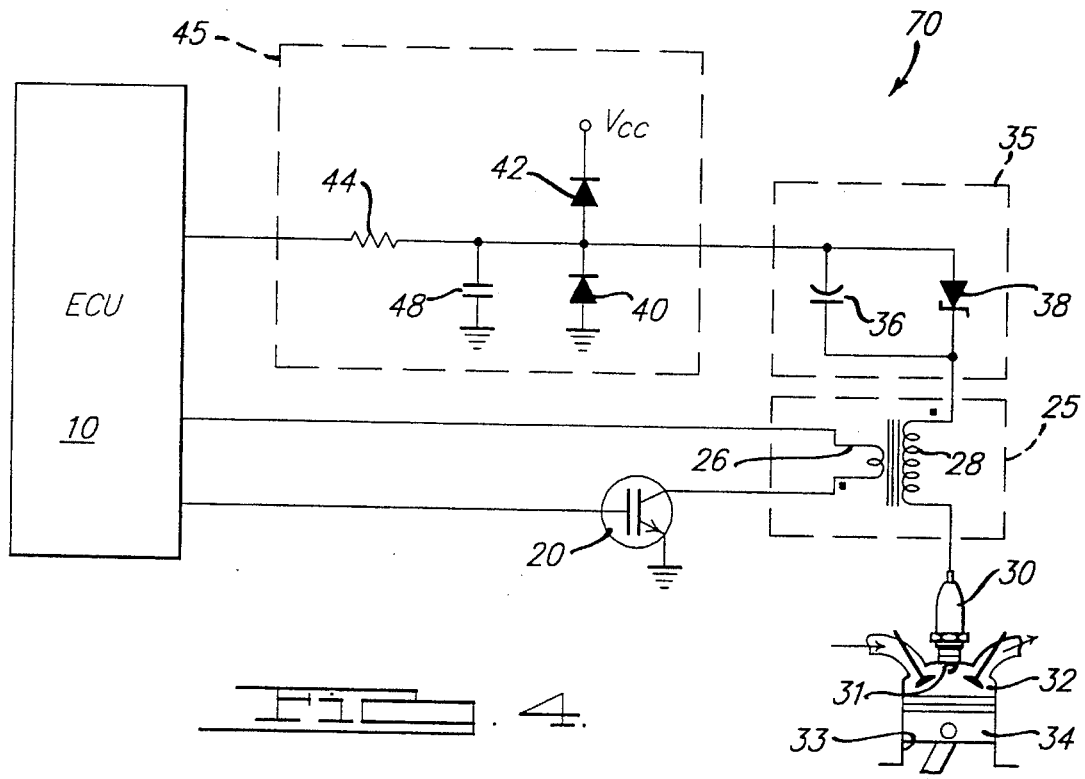
FIG. 4 is a schematic view of a current ionization sensing system of the present invention.

Referring now to FIG. 4, an alternative embodiment of the present invention for a ionization current system 70 is shown. The control system 70 comprises an engine controller or Electronic Control Unit (ECU) 10. The ionization current system 70 further includes an ignition coil 25, having a primary 26 and secondary winding 28, for providing current to a spark plug 30 upon ignition of the vehicle. The spark plug 30 is electrically connected to the secondary winding 28 of the ignition coil 25 and is mounted on the head of the cylinder 33. The spark plug 30 has electrodes 31 disposed within a combustion chamber 32 of the vehicle for igniting an air/fuel mixture in the combustion chamber 32 when voltage arching occurs between the electrodes 31. The combustion chamber 32 is defined by walls of the cylinder 33 and a piston 34 which is received in the cylinder 33.

The ionization current sensing system 70 further comprises a power transistor 20 having a base, an emitter, and a collector. The transistor 20 could also be a MOSFET having a gate, source, and a drain. The base or gate being connected to the DWELL output signal 18 of the ECU 10, the emitter or source grounded, and the collector or drain connected to the primary winding 26 of the ignition coil 25. The ECU 10 has a DWELL output signal 18 for providing current and voltage to the base of the power transistor 20. The ECU 10 also supplies a Vbat voltage output signal for supplying voltage directly to the primary winding 26 of the ignition coil 25.

The ionization current sensing system 70 also includes a sense voltage source 35 for sensing the ionization which occurs in the combustion chamber 32. The sense voltage source 35 consists of a zener diode 38 and a capacitor 36. The zener diode's cathode being electrically connected to the secondary winding 28 of the ignition coil 25 and the positive polarity side of capacitor 36. The capacitor's negative polarity terminal connected to the anode of the zener diode 38 and also connected to the input line of the integrator 45.

The integrator 45 comprises two diodes 40, 42. The anode of diode 40 is grounded while the cathode is connected to the anode of diode 42 which is also connected to the integrator 45 input. The cathode of diode 42 is connected to a voltage source Vcc. The integrator 45 further includes a capacitor 48 connected to the diode junction and integrator input by one lead and grounded at the other lead. A resistor 44 is also provided with one lead connected to the capacitor 48 at the integrator input connection and a second lead connected to the integrator output.

The functional description of FIG. 4 is as follows. FIG. 4 shows a circuit diagram of an ionization current sensing system 70 with a capacitor based integrator 45. During ignition of the vehicle, the ECU 10 supplies a constant Vbat voltage signal to the primary winding 26 and a DWELL voltage signal 18 to the power transistor 20. Applying the DWELL voltage signal 18 to transistor 20 causes the transistor 20 to conduct, thereby building up current in the primary winding 26 of the ignition coil 25. As shown in FIG. 6, during the time the DWELL voltage signal 18 is being applied to transistor 20, the voltage of the primary winding 26 is decreased in proportion. When the DWELL signal 18 is turned off by the ECU 10, a voltage spike occurs at the primary winding 26 and the magnetic field of the ignition coil 25 starts to collapse. Such an occurrence generates a high voltage on the secondary winding 28. As shown in FIG. 4, the winding polarities of the primary and secondary winding are inverse such that when a positive voltage is applied to the power transistor terminal of the primary winding 26 a positive voltage will result at the sense voltage terminal of the secondary winding 28 and vice versa. Given such polarity when the DWELL signal 18 is turned off, the spark plug 30 will receive a negative voltage which lowers the breakdown voltage between the electrodes 31 of the spark plug 30. This allows a spark to more easily occur between the spark plug electrodes 31, especially for warm spark plugs.

After a spark occurs between the electrodes 31, DC current starts to flow from the sense voltage terminal of the secondary winding into the sense voltage source 35. Capacitor 36 is then charged to a voltage limited by zener diode 38 to approximately 100 volts. During coil discharge, capacitor 48 is charged to a voltage which is equal to Vcc plus diode voltage drop on diode 42. Such an occurrence has the effect of resetting the integrator 45. Subsequent to the start of coil discharge, capacitor 36 serves as a sense voltage module causing the ionization current to flow through the ignition coil's secondary winding 28 and the spark plug 30. The same current flows from the negative side of capacitor 36 into the current integrator 45 causing its output to fall as shown in FIG. 6.

The voltage output of integrator 45 is set between ground and Vcc for normal engine operation. If there is no combustion in the combustion chamber 32, there will be no ionization current flow after the ignition coil 25 discharges. Thus, the output of integrator 45 will remain at a high voltage state approximately equal to Vcc. Given the occurrence of a shorted spark plug, the voltage output of integrator 45 will fall to ground shortly after coil discharge.

Figure 5:
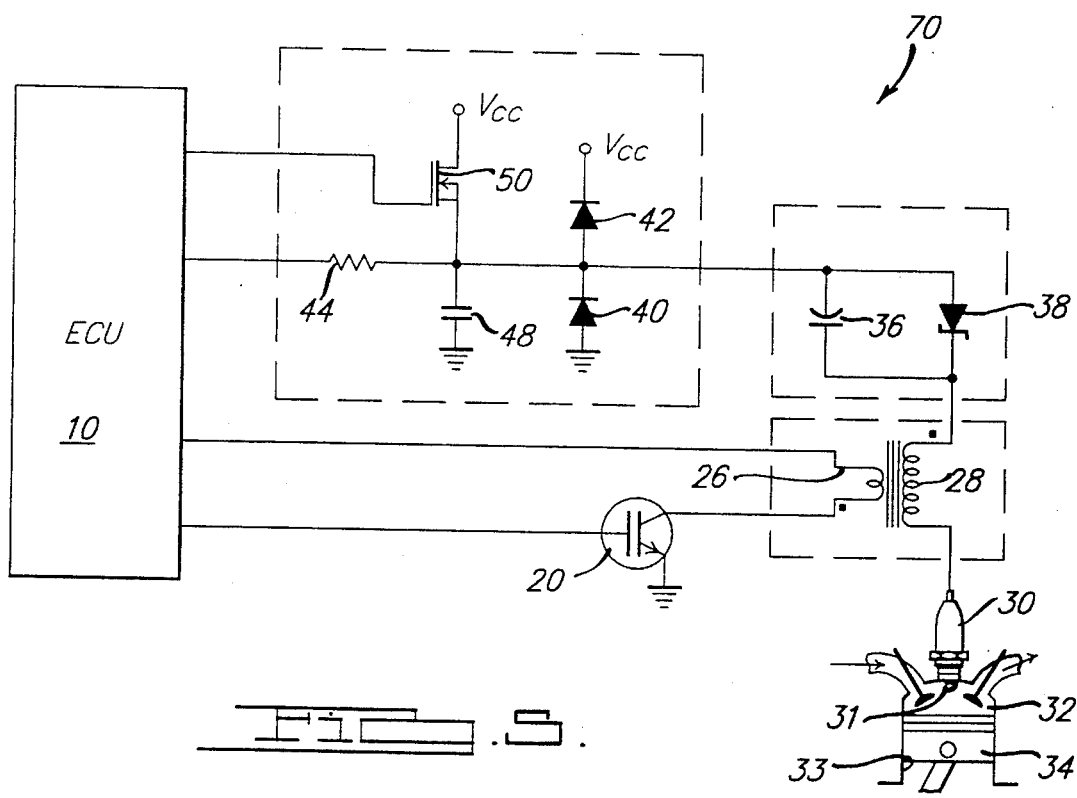
FIG. 5 is a schematic view of a current ionization sensing system of the present invention as shown in FIG. 4 with an additional reset circuit switch.

Referring to FIG. 5, an alternative embodiment of the circuit of FIG. 4, for a ionization current system 70, is shown. The control system 70 comprises an engine controller or Electronic Control Unit (ECU) 10. The ECU 10 includes a microprocessor, memory (volatile and non-volatile), bus lines (address, control, and data), and other hardware and software needed to perform the task of engine control. The ionization current system 70 further includes an ignition coil 25, having a primary 26 and secondary winding 28, for providing current to a spark plug 30 upon ignition of the vehicle. The spark plug 30 is electrically connected to the secondary winding 28 of the ignition coil 25 and is mounted on the head of the cylinder 33. The spark plug 30 has electrodes 31 disposed within a combustion chamber 32 of the vehicle for igniting an air/fuel mixture in the combustion chamber 32 when voltage arcing occurs between the electrodes 31. The combustion chamber 32 is defined by walls of the cylinder 33 and a piston 34 which is received in the cylinder 33.

The ionization current sensing system 70 further comprises a power transistor 20 having a base, an emitter, and a collector. The transistor 20 could also be a MOSFET having a gate, source, and a drain. The base or gate being connected to the DWELL output signal 18 of the ECU 10, the emitter or source grounded, and the collector or drain connected to the primary winding 26 of the ignition coil 25. The ECU 10 has a DWELL output signal 18 for providing current and voltage to the base of the power transistor 20. The ECU 10 also supplies a Vbat voltage output signal for supplying voltage directly to the primary winding 26 of the ignition coil 25.

The ionization current sensing system 70 also includes a sense voltage source 35 for sensing the ionization which occurs in the combustion chamber 32. The sense voltage source 35 consists of a zener diode 38 and a capacitor 36. The zener diode's cathode being electrically connected to the secondary winding 28 of the ignition coil 25 and the positive polarity side of capacitor 36. The capacitor's negative polarity terminal connected to the anode of the zener diode 38 and also connected to the input line of the integrator 45.

The integrator 45 comprises two diodes 40, 42. The anode of diode 40 is grounded while the cathode is connected to the anode of diode 42 which is connected to the integrator 45 input. The cathode of diode 42 is supplied by a voltage source Vcc. The integrator 45 further includes a capacitor 48 connected to the diode junction and integrator input by one lead and grounded at the other lead. A resistor 44 is also provided with one lead connected to the capacitor 48 at the integrator input connection and a second lead connected to the integrator output.

The circuit shown in FIG. 5 also includes a reset circuit switch 50. The switch 50 consists of a small signal N-Channel MOSFET having a gate, drain, and a source. It is to be expressly understood that many different switches, both solid state and mechanical, could be used to provide circuit reset in the present invention. The source of switch 50 is connected to the node connecting resistor 44 and capacitor 48. While the drain is connected to the voltage source Vcc. The gate of switch 50 is connected to the ECU 10, or an alternative circuit, for receiving a reset signal.

The functional description of FIG. 5 is as follows. FIG. 5 shows a circuit diagram of an ionization current sensing system 70 with a capacitor based integrator 45. During ignition of the vehicle, the ECU 10 supplies a constant Vbat voltage signal to the primary winding 26 and a DWELL voltage signal 18 to the power transistor 20. Applying the DWELL voltage signal 18 to transistor 20 causes the transistor 20 to conduct thereby building up current in the primary winding 26 of the ignition coil 25. As shown in FIG. 6, during the time the DWELL voltage signal 18 is being applied to transistor 20, the voltage of the primary winding 26 is decreased in proportion. When the DWELL signal 18 is turned off by the ECU 10, a voltage spike occurs at the primary winding 26 and the magnetic field of the ignition coil 25 starts to collapse. Such an occurrence generates a high voltage on the secondary winding 28. As shown in FIG. 5, the winding polarities of the primary and secondary winding are inverse such that when a positive voltage is applied to the power transistor terminal of the primary winding 26 a positive voltage will result at the sense voltage terminal of the secondary winding 28 and vice versa. Given such polarity when the DWELL signal 18 is turned off, the spark plug 30 will receive a negative voltage which lowers the breakdown voltage between the electrodes 31 of the spark plug 30. This allows a spark to more easily occur between the spark plug electrodes 31, especially for warm spark plugs.

After a spark occurs between the electrodes 31, DC current starts to flow from the sense voltage terminal of the secondary winding into the sense voltage source 35. Capacitor 36 is then charged to a voltage limited by zener diode 38 to approximately between 100 to 200 volts. During coil discharge, capacitor 48 is charged to a voltage which is equal to Vcc+diode voltage drop on diode 42. Such an occurrence has the effect of resetting the integrator 45. Subsequent to the start of coil discharge, capacitor 36 serves as a sense voltage module causing the ionization current to flow through the ignition coil's secondary winding 28 and the spark plug 30. The same current flows from the negative side of capacitor 36 into the current integrator 45 causing its output to fall as shown in FIG. 6.

The voltage output of integrator 45 is set between ground and Vcc for normal engine operation. If there is no combustion in the combustion chamber 32, there will be no ionization current flow after the ignition coil 25 discharges. Thus, the output of integrator 45 will remain at a high voltage state approximately equal to Vcc. Given the occurrence of a shorted spark plug, the voltage output of integrator 45 will fall to ground shortly after coil discharge.

As shown in FIG. 5, a reset circuit switch 50 is provided. The ionization current integrator 45 is reset each time an arc occurs between the electrodes 31 of the spark plug 30 so that the circuit is prepared for the next combustion occurrence in the combustion chamber 32. The additional resetting may be desirable for diagnostic purposes such as checking and measuring spark plug leakage current offset. The reset circuit switch 50 operates by a voltage reset signal being applied from ECU 10 to the gate of the switch 50. Such an occurrence causes switch 50, consisting of a small N-channel MOSFET, to start conducting and thereby resetting the ionization current integrator 45. A bi-polar transistor could also be used for switch 50.

In FIGS. 1, 2, 4, and 5 of the present current ionization detection system 70 display a circuit for a single cylinder 33. Accordingly, in the preferred embodiment of the present invention, one circuit is to be used for each cylinder 33. However, it is possible to use a single integrator for two cylinders and corresponding ignition coils if the cylinders are firing 360 degrees apart.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. An ionization current sensing system for a vehicle, the vehicle having a plurality of spark plugs with electrodes, each spark plug disposed within a combustion chamber in a cylinder and producing an ionization current upon combustion in the chamber, each spark plug in electrically operable relation with an ignition coil having a primary and a secondary winding, the ionization current sensing system comprising:

a transistor connected to the primary winding of the ignition coil for supplying a charging current to the primary winding of the ignition coil, the charging current inducing a voltage potential in the secondary winding;

sense voltage means directly in communication with the secondary winding of the ignition coil for sensing a spark plug ionization current and producing an output signal for integration; and integrator means, having an input and output, the input directly connected to the sense voltage means output for integrating the output signal produced by the sense voltage means and creating a voltage output in proportion to the integral of the ionization current emitted by the spark plug, the integrator means comprising an integrator reset switch connected between the input and output of the integrator means, the reset switch for changing the output signal of the integrator means to a different voltage state when a voltage is applied to the reset switch.

2. The ionization current sensing system of claim 1 wherein the integrator means comprises an operational amplifier for setting a voltage range of the integrator means output signal, the operational amplifier connected between the input and output of the integrator means.

3. The ionization current sensing system of claim 2 wherein the voltage sensing means comprises a zener diode and a capacitor connected in parallel, the capacitor for storing a voltage relative to the ionization current of the spark plug and the diode for limiting the amount of capacitor charging voltage.

4. The ionization current sensing system of claim 1 wherein the integrator means comprises at least two diodes for setting a voltage range of the integrator means output signal, the diodes in communication with the input and output of the integrator means.

5. The ionization current sensing system of claim 4 wherein the voltage sensing means comprises a zener diode and a capacitor communicating in parallel, the capacitor for storing a voltage relative to the ionization current of the spark plug and the diode for limiting the amount of capacitor charging voltage.

6. An ionization current sensing system for a vehicle, the vehicle having a plurality of spark plugs with electrodes, each spark plug disposed within a combustion chamber in a cylinder and producing an ionization current upon combustion in the chamber, each spark plug in electrically operable relation with an ignition coil having a primary and a secondary winding, the ionization current sensing system comprising:

- a power transistor in communication with the primary winding of the ignition coil for supplying a charging current to the primary winding of the ignition coil, the charging current inducing a voltage potential in the secondary winding;
- sense voltage means directly in communication with the secondary winding of the ignition coil at its input for sensing a spark plug ionization current and producing an output signal for integration;
- integrator means, having an input and output, the input directly in communication with the sense voltage means output for integrating the output signal produced by the sense voltage means and creating a voltage output in proportion to the integral of the ionization current emitted by the spark plug;
- an Electronic Control Unit (ECU) in electrically operable relation with the power transistor and the integrator means output, the ECU providing control signals to the power transistor for transistor operation and receiving the integrator means output signals to determine if engine misfire has occurred; and
- an internal integrator reset switch in communication with the integrator means input and output for changing the output signal of the integrator to a different voltage state when the ignition coil is in a charging state.

7. The ionization current sensing system of claim 6 wherein the integrator means comprises an operational amplifier for setting a voltage range of the integrator means output signal, the operational amplifier in communication with the input and an output leads of the integrator means.

8. The ionization current sensing system of claim 7 wherein the integrator means further comprises a transistor integrator reset switch in communication with the input and output leads of the integrator means, the reset switch for changing the output signal of the integrator means to a different voltage state when a voltage is applied to the switch.

9. The ionization current sensing system of claim 8 wherein the voltage sensing means comprises a zener diode and a capacitor communicating in parallel, the capacitor for storing a voltage relative to the ionization current and the diode for limiting the amount of capacitor charging voltage.

10. The ionization current sensing system of claim 6 wherein the integrator means comprises at least two diodes for setting a voltage range of the integrator means output signal, the diodes in communication with the input and output of the integrator means.

11. The ionization current sensing system of claim 10 wherein the integrator means further comprises a transistor integrator reset switch in communication with the input and an output of the integrator means, the reset switch for changing the output signal of the integrator means to a different voltage state when a voltage is applied to the switch.

12. The ionization current sensing system of claim 11 wherein the voltage sensing means comprises a zener diode and a capacitor communicating in parallel, the capacitor for storing a voltage relative to the ionization current and the diode for limiting the amount of capacitor charging voltage.

13. An ionization current sensing system for a vehicle, the vehicle having a plurality of spark plugs with electrodes, each spark plug disposed within a combustion chamber in a cylinder and producing an ionization current upon combustion in the chamber, each spark plug in electrically operable relation with an ignition coil having a primary and a secondary winding, the ionization current sensing system comprising:

- a power transistor in communication with the primary winding of the ignition coil for supplying a charging current to the primary winding of the ignition coil, the charging current inducing a voltage potential in the secondary winding;
- sense voltage means directly in communication with the secondary winding of the ignition coil for sensing a spark plug ionization current comprising a zener diode and a capacitor communicating in parallel, the capacitor for storing a voltage relative to the ionization current and the diode for limiting the amount of capacitor charging voltage;
- an integrating current to voltage converter, having input and output leads, the input directly in communication with the sense voltage means output for receiving and integrating a spark plug ionization current and creating a voltage output signal in proportion to the integral of the ionization current emitted by the spark plug;
- an Electronic Control Unit (ECU) in electrically operable relation with the power transistor and the integrator means output, the ECU providing control signals to the power transistor for transistor operation and receiving the integrating current to voltage converter output signals to determine if engine misfire has occurred; and
- an internal integrator reset switch in communication with the integrating current to voltage converter input and output for changing the output signal of the integrator means to a different voltage state when the ignition coil is in a charging state.

14. The ionization current sensing system of claim 13 wherein the integrating current to voltage converter comprises an operational amplifier for setting a voltage range of the integrating current to voltage converter output, the operational amplifier in communication with the input and output of the integrating current to voltage converter.

15. The ionization current sensing system of claim 14 wherein the integrating current to voltage converter further comprises a transistor integrator reset switch in communication with the input and output of the integrating current to voltage converter, the reset switch for changing the output signal of the integrator converter to a different voltage state when a voltage is applied to the switch.

16. The ionization current sensing system of claim 13 wherein the integrating current to voltage converter comprises at least two diodes for setting a voltage range of the integrating current to voltage converter output, the diodes in communication with the input and output of the integrating current to voltage converter.

17. The ionization current sensing system of claim 16 wherein the integrating current to voltage converter further comprises a transistor integrator reset switch in communication with the input and output of the integrating current to voltage converter, the reset switch for changing the output signal of the integrator converter to a different voltage state when a voltage is applied to the switch.

* * * * *